(12) United States Patent
Suzuki

(10) Patent No.: US 6,667,855 B2
(45) Date of Patent: Dec. 23, 2003

(54) DISK DRIVE CAPABLE OF AVOIDING THE CONTACT OF DISK AND HEAD SLIDER IN LOADING

(75) Inventor: Atsushi Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/365,989

(22) Filed: Feb. 13, 2003

(65) Prior Publication Data

US 2003/0123192 A1 Jul. 3, 2003

Related U.S. Application Data

(62) Division of application No. 09/708,835, filed on Nov. 8, 2000, now Pat. No. 6,545,843.

(30) Foreign Application Priority Data

Jan. 12, 2000 (JP) .......................................... 2000-003664

(51) Int. Cl.⁷ .............................................. G11B 17/32
(52) U.S. Cl. .................................................. 360/236.2
(58) Field of Search .......................... 360/236.2–236.9

(56) References Cited

U.S. PATENT DOCUMENTS

| | | | | |
|---|---|---|---|---|
| 5,267,108 A | * | 11/1993 | Tani | |
| 5,499,149 A | * | 3/1996 | Dovek | |
| 5,515,219 A | * | 5/1996 | Ihrke et al. | |
| 5,568,981 A | * | 10/1996 | Nepela et al. | ................. 384/12 |
| 5,959,805 A | * | 9/1999 | Kawasaki et al. | |
| 6,172,851 B1 | * | 1/2001 | Utsunomiya | ............. 360/236.3 |
| 6,191,915 B1 | | 2/2001 | Takagi et al. | |
| 6,243,235 B1 | | 6/2001 | Fu et al. | |
| 6,417,992 B2 | | 7/2002 | Sugimoto et al. | |
| 6,424,498 B1 | | 7/2002 | Patterson et al. | |
| 6,462,911 B1 | | 10/2002 | Tokuyama et al. | |
| 6,501,621 B1 | * | 12/2002 | Griffin et al. | ............. 360/235.6 |

FOREIGN PATENT DOCUMENTS

| | | |
|---|---|---|
| JP | 01107386 A | 4/1989 |
| JP | 05250834 | 9/1993 |
| JP | 07161162 | 6/1995 |
| JP | 08279132 | 10/1996 |

* cited by examiner

Primary Examiner—Allen Cao
(74) Attorney, Agent, or Firm—Greer, Burns & Crain, Ltd.

(57) ABSTRACT

Disclosed herein is a disk drive including a housing having a base, a disk rotatably mounted in the housing and having a plurality of tracks, a negative pressure type head slider having a transducer for reading/writing data from/to a disk, an actuator for moving the head slider across tracks of the disk, a mechanism for controlling the actuator to load/unload the head slider with respect to the disk, and a ramp member fixed to the base for supporting the head slider unloaded. The actuator includes a suspension having a gimbal, a reinforcing plate fixed to the suspension, and the head slider mounted on the gimbal. The reinforcing plate has a pivot for supporting the head slider at a position shifted from the longitudinal center of the head slider toward an air outlet end of the head slider by a distance less than 20% of the length of the head slider.

4 Claims, 13 Drawing Sheets

F I G. 6
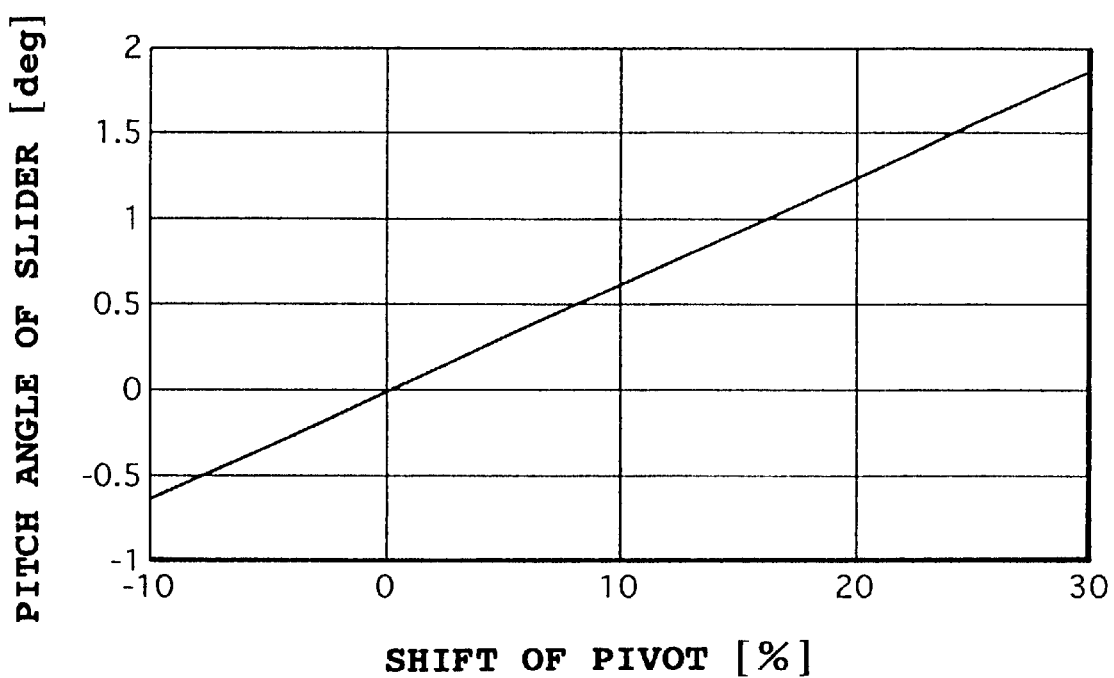

F I G. 12
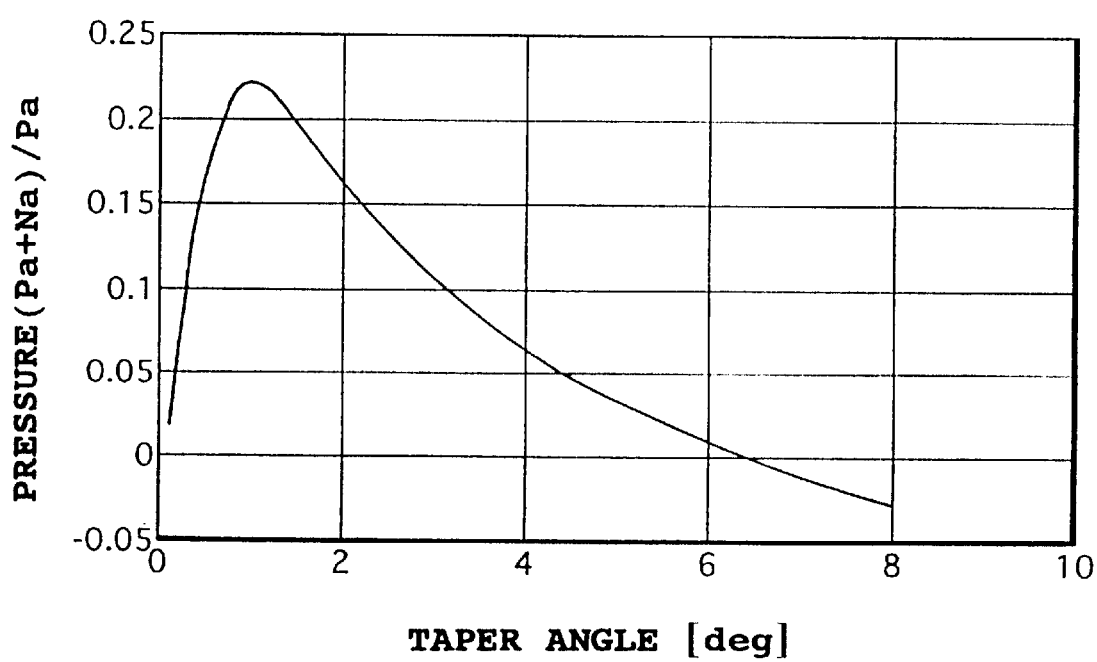

DISK DRIVE CAPABLE OF AVOIDING THE CONTACT OF DISK AND HEAD SLIDER IN LOADING

This is a division of application Ser. No. 09/708,835 filed Nov. 8, 2000 now U.S. Pat. No. 6,545,843.

BACKGROUND OF THE INVENTION

1. Field of the Invention

The present invention relates generally to a magnetic disk drive, and more particularly to a negative pressure type magnetic head slider for a load/unload type magnetic disk drive.

2. Description of the Related Art

In recent magnetic disk drives with decreasing size and increasing storage capacity, it has been desired to reduce the flying height of a head slider and realize contact recording/reproduction such that the head slider flies a microscopic height from a recording medium such as a magnetic disk or comes into contact with the recording medium. To reduce the flying height of the head slider, the surface roughness of the surface of the magnetic disk must be reduced. In a contact start and stop (CSS) type magnetic disk drive heretofore widely used, a flying surface of a magnetic head slider comes into contact with a magnetic disk upon stoppage of rotation of the magnetic disk, and flies above the surface of the magnetic disk during rotation of the magnetic disk by the action of an air flow produced in concert with the rotation of the magnetic disk.

However, if the surface roughness of the magnetic disk in the CSS type magnetic disk drive is reduces, the contact area between the flying surface (air bearing surface) of the magnetic head slider and the surface of the magnetic disk upon stoppage of rotation of the magnetic disk becomes large. Accordingly, there is a possibility of stiction between the magnetic head slider and the magnetic disk at the starting rotation of the magnetic disk. As a measure against this stiction problem, it has been proposed to apply texture forming by laser to a CSS zone of the magnetic disk or provide a plurality of pads (projections) on the flying surface (air bearing surface) of the head slider in the CSS type magnetic disk drive.

A portable personal computer such as a notebook personal computer is often carried, and it is therefore required to have high shock resistance. Accordingly, such a personal computer generally employs a load/unload type magnetic disk drive designed so that a head slider is unloaded from the surface of a magnetic disk when the computer is powered off or put into a sleep mode and that the head slider is loaded to the surface of the magnetic disk when the computer is operated. That is, when the computer is powered off or put into a sleep mode, a horn portion formed at the front end of a suspension is seated on a ramp (inclined portion) of a ramp member provided near the outer circumference of the magnetic disk to retract the head slider flying a microscopic height above the disk surface from the magnetic disk. Accordingly, even when the computer receives shock, it is possible to avoid the possibility that the head slider may collide with the magnetic disk to damage the magnetic disk.

Such a magnetic disk drive having a load/unload mechanism is required to have a highly reliable magnetic head slider that is prevented from coming into contact or collision with a magnetic disk not only while the head slider is flying above the disk, but also when the head slider is loaded to the disk.

A negative pressure type magnetic head slider is widely used in recent magnetic disk drives, so as to reduce the flying height of the magnetic head slider from the magnetic disk. A conventional negative pressure type magnetic head slider is mounted on a suspension so that the flying surface of the head slider becomes parallel to the magnetic disk at the instant when the head slider is loaded from the ramp member to the magnetic disk. Accordingly, there is a possibility that the head slider may come into contact with the disk because of a negative pressure generated on the head slider at the instant of loading.

Particularly in the case that a groove for generating a negative pressure is formed on the flying surface of the head slider so as to extend from a position upstream of the longitudinal center of the head slider to an air outlet end of the head slider, the head slider is inclined so that an air inlet end of the head slider is drawn to the magnetic disk by the negative pressure at the instant of loading, causing the contact of the air inlet end with the magnetic disk. Further, in the case that the head slider is mounted on a suspension having a pivot for supporting the head slider by applying a push load, the head slider is supported at its longitudinal center by the pivot.

Accordingly, in the case that the above-mentioned groove for generating a negative pressure is formed on the head slider, the attitude of the head slider cannot be controlled by the push load. As a result, the head slider is inclined so that the air inlet end is drawn to the magnetic disk by the negative pressure at the instant of loading, causing the contact of the air inlet end with the magnetic disk. Further, in the case that the head slider has a taper near the air inlet end or a pad having a raised surface and a step surface lower in level than the raised surface for generating a positive pressure near the air inlet end, and that the above-mentioned groove for generating a negative pressure is formed on the head slider, there is a possibility that the negative pressure may become greater than the positive pressure, depending upon the mounted attitude of the head slider. Accordingly, the head slider is inclined so that the air inlet end is drawn to the magnetic disk by the negative pressure at the instant of loading, causing the contact of the air inlet end with the magnetic disk.

SUMMARY OF THE INVENTION

It is therefore an object of the present invention to provide a negative pressure type magnetic head slider for use in a magnetic disk drive having a load/unload mechanism which can reliably prevent the contact of the head slider with a magnetic disk at the time of loading.

It is another object of the present invention to provide a magnetic disk drive having a load/unload mechanism which can reliably prevent the contact of a magnetic head slider with a magnetic disk at the time of loading.

In accordance with an aspect of the present invention, there is provided a disk drive comprising a housing having a base; a disk rotatably mounted in the housing and having a plurality of tracks; a negative pressure type head slider having a transducer for reading/writing data from/to the disk, an air inlet end, and an air outlet end; an actuator for moving the head slider across the tracks of the disk; means for controlling the actuator to load/unload the head slider with respect to the disk; and a ramp member fixed to the base for supporting the head slider unloaded; the actuator comprising an actuator arm rotatably mounted to the base; and a head assembly mounted on a front end portion of the actuator arm; the head assembly comprising a suspension; a gimbal formed integrally with the suspension and having a slider mounting portion; the head slider mounted on the slider mounting portion of the gimbal; and a supporting plate fixed to the suspension and having a pivot kept in contact with the slider mounting portion of the gimbal to support the head slider; the pivot supporting the head slider at a position shifted from the longitudinal center of the head slider toward the air outlet end by a distance less than 20% of the length of the head slider.

Preferably, the pivot supports the head slider at a position shifted from the longitudinal center of the head slider toward the air outlet end by a distance falling in the range of about 4% to about 15% of the length of the head slider.

In accordance with another aspect of the present invention, there is provided a disk drive comprising a housing having a base; a disk rotatably mounted in the housing and having a plurality of tracks; a negative pressure type head slider having a transducer for reading/writing data from/to the disk, an air inlet end, an air outlet end, and a disk opposing surface; an actuator for moving the head slider across the tracks of the disk; means for controlling the actuator to load/unload the head slider with respect to the disk; and a ramp member fixed to the base for supporting the head slider unloaded; the actuator comprising an actuator arm rotatably mounted to the base; and a head assembly mounted on a front end portion of the actuator arm; the head assembly comprising a suspension; a gimbal formed integrally with the suspension and having a slider mounting portion and a neck portion for connecting the slider mounting portion and the suspension; and the head slider mounted on the slider mounting portion of the gimbal; the neck portion being bent in such a direction that the disk opposing surface of the head slider is inclined with respect to the disk so as to raise the air inlet end in order that a given pitch angle is given to the head slider when the head slider is separated from the ramp member and loaded above the disk.

In accordance with a further aspect of the present invention, there is provided a disk drive comprising a housing having a base; a disk rotatably mounted in the housing and having a plurality of tracks; a negative pressure type head slider having a transducer for reading/writing data from/to the disk, an air inlet end, an air outlet end, and a disk opposing surface; an actuator for moving the head slider across the tracks of the disk; means for controlling the actuator to load/unload the head slider with respect to the disk; and a ramp member fixed to the base for supporting the head slider unloaded; the actuator comprising an actuator arm rotatably mounted to the base; a suspension having a base end portion fixed to a front end portion of the actuator arm; and the head slider mounted on a front end portion of the suspension; the head slider comprising a pair of rails formed on the disk opposing surface, each of the rails having a flat air bearing surface for generating a flying force during rotation of the disk; a groove defined between the rails for generating a negative pressure by expanding air once compressed near the air inlet end; a first taper formed at an end portion of each rail near the air inlet end so as to continue to the air bearing surface, the first taper having a first taper angle; and a second taper formed at the end portion of each rail so as to continue to the first taper, the second taper having a second taper angle larger than the first taper angle.

Preferably, the first taper angle is in the range of 0.1° to 3°, and the second taper angle is not greater than 6°.

In accordance with a still further aspect of the present invention, there is provided a disk drive comprising a housing having a base; a disk rotatably mounted in the housing and having a plurality of tracks; a negative pressure type head slider having a transducer for reading/writing data from/to the disk, an air inlet end, an air outlet end, and a disk opposing surface; an actuator for moving the head slider across the tracks of the disk; means for controlling the actuator to load/unload the head slider with respect to the disk; and a ramp member fixed to the base for supporting the head slider unloaded; the actuator comprising an actuator arm rotatably-mounted to the base; a suspension having a base end portion fixed to a front end portion of the actuator arm; and the head slider mounted on a front end portion of the suspension; the head slider comprising a front pad formed on the disk opposing surface near the air inlet end, the front pad having a raised surface and a step surface lower in level than the raised surface; a groove for generating a negative pressure by expanding air once compressed by the front pad; and a taper formed adjacent to the air inlet end so as to continue to the step surface, the taper having a given taper angle.

Preferably, the given taper angle is in the range of 0.1° to 6°.

In accordance with a still further aspect of the present invention, there is provided a disk drive comprising a housing having a base; a disk rotatably mounted in the housing and having a plurality of tracks; a negative pressure type head slider having a transducer for reading/writing data from/to the disk, an air inlet end, an air outlet end, and a disk opposing surface; an actuator for moving the head slider across the tracks of the disk; means for controlling the actuator to load/unload the head slider with respect to the disk; and a ramp member fixed to the base for supporting the head slider unloaded; the actuator comprising an actuator arm rotatably mounted to the base; a suspension having a base end portion fixed to a front end portion of the actuator arm; and the head slider mounted on a front end portion of the suspension; the head slider comprising a front pad formed on the disk opposing surface near the air inlet end, the front pad having a raised surface, a first step surface lower in level than the raised surface, and a second step surface lower in level than the first step surface; and a groove for generating a negative pressure by expanding air once compressed by the front pad.

Preferably, the length of the second step surface in the longitudinal direction of the head slider is in the range of 10 $\mu$m to 100 $\mu$m.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 6 is a graph showing the relation between a pivot position and a pitch angle of a head slider;

FIG. 12 is a graph showing the proportion of a negative pressure to a positive pressure according to a taper angle in the fourth preferred embodiment;

DETAILED DESCRIPTION OF THE PREFERRED EMBODIMENTS

Figure 1:
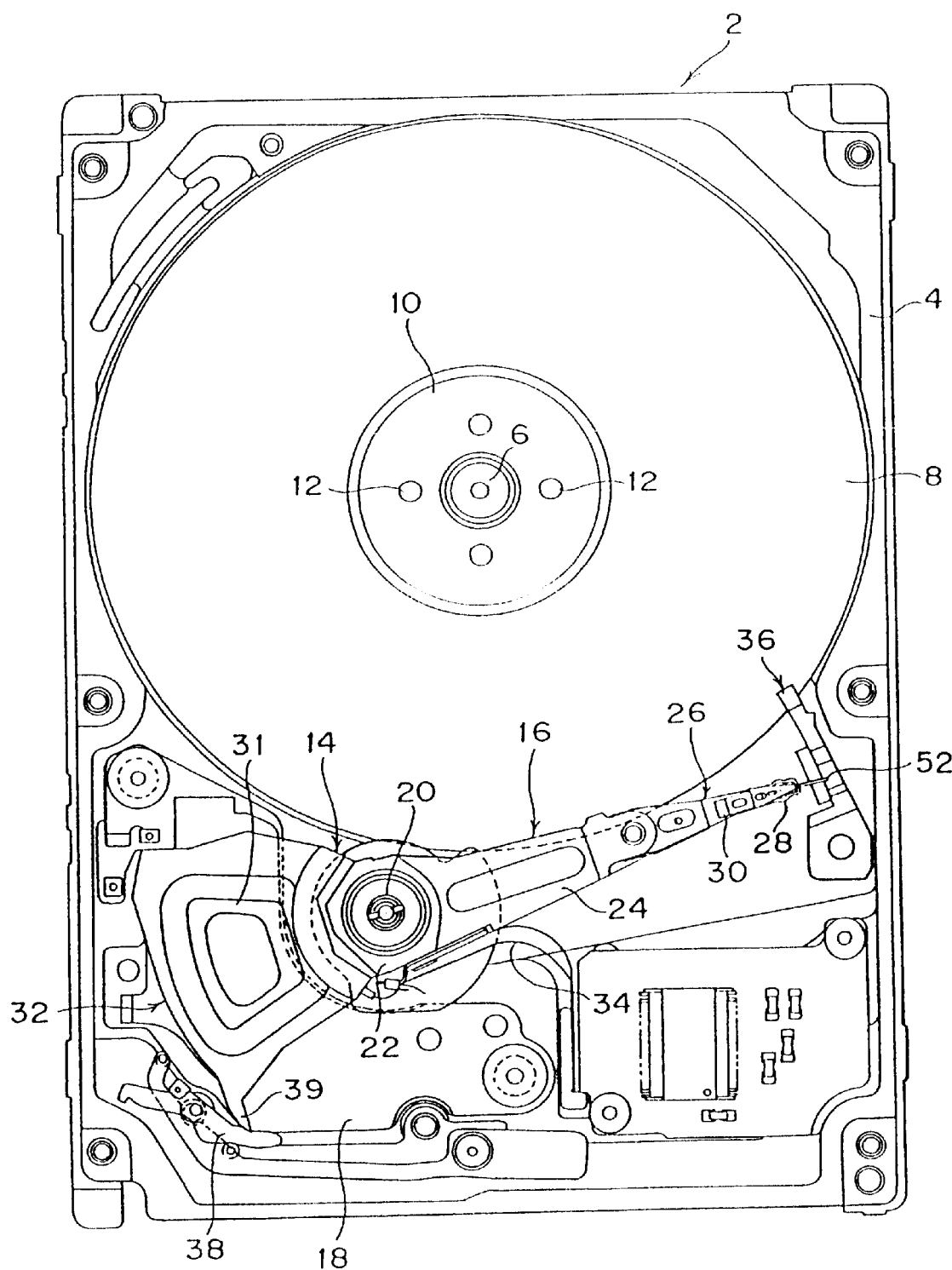
FIG. 1 is a plan view of a magnetic disk drive with a cover removed.

Referring to FIG. 1, there is shown a plan view of a magnetic disk drive according to a first preferred embodiment of the present invention in the condition where a cover is removed. Reference numeral 2 denotes a housing consisting of a base 4 and the cover (not shown) fixed to the base 4. A shaft 6 is fixed to the base 4, and a spindle hub (not shown) is rotatably mounted on the shaft 6. The spindle hub is driven by a DC motor (not shown) to rotate about the shaft 6. A plurality of magnetic disks 8 and spacers (not shown) are mounted on the spindle hub so as to be alternately stacked. That is, the plural magnetic disks 8 are fixedly mounted on the spindle hub by securing a disk clamp 10 to the spindle hub by means of a plurality of screws 12, and are equally spaced a given distance by the spacers.

Reference numeral 14 denotes a rotary actuator consisting of an actuator arm assembly 16 and a magnetic circuit 18. The actuator arm assembly 16 is rotatable about a shaft 20 fixed to the base 4. The actuator arm assembly 16 includes an actuator block 22 rotatably mounted on the shaft 20 through a pair of bearings (not shown), a plurality of actuator arms 24 extending horizontally from the actuator block 22 in one direction, and a head assembly 26 fixed to a front end portion of each actuator arm 24.

Each head assembly 26 includes a negative pressure type head slider 28 having a magnetic head element (transducer) for reading/writing data from/to the corresponding magnetic disk 8, and a suspension (load beam) 30 having a front end portion supporting the head slider 28 and a base end portion fixed to the corresponding actuator arm 24. A coil 31 is supported on the opposite side of the actuator arms 24 with respect to the shaft 20. The coil 31 is inserted in a gap of the magnetic circuit 18. The magnetic circuit 18 and the coil 31 constitute a voice coil motor (VCM) 32. Reference numeral 34 denotes a flexible printed circuit board (FPC) for supplying a write signal to the magnetic head element and for taking a read signal from the magnetic head element. One end of the flexible printed circuit board 34 is fixed to a side surface of the actuator block 22.

Figure 2A:
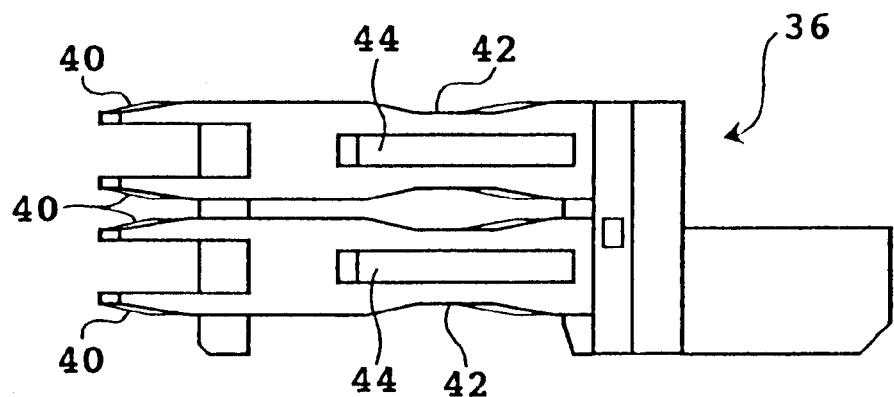
FIG. 2A is a side view of a ramp member.
Figure 2B:
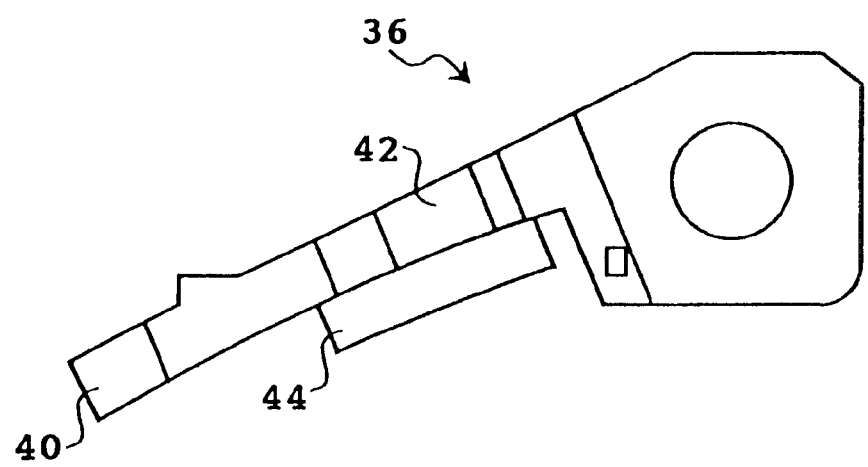
FIG. 2B is a plan view of the ramp member shown in FIG. 2A.

A ramp member 36 is fixed to the base 4 at a position adjacent to the outer circumferences of the magnetic disks 8. As shown in FIGS. 2A and 2B, the ramp member 36 has a plurality of ramps (inclined portions) 40 whose number corresponds to the number of the head sliders 28, and a plurality of parking portions 42 each for allowing a horn portion 52 formed at the front end of each head assembly 26 to be stably parked thereon. Further, a plurality of side projections 44 for preventing the unloaded head sliders 28 from interfering with each other are formed on a side surface of the ramp member 36. Reference numeral 38 in FIG. 1 denotes a latch mechanism for latching a projecting portion 39 of the actuator 14 in its unloaded condition.

The condition shown in FIG. 1 is an unloaded condition where the head sliders 28 have been unloaded from the magnetic disks 8. In this condition, the horn portions 52 of the head assemblies 26 are parked on the parking portions 42 of the ramp member 36, and the projecting portion 39 of the actuator 14 is latched by the latch mechanism 38. When a computer connected to this magnetic disk drive is powered on or a sleep mode is canceled in this unloaded condition, the magnetic disks 8 first start to be rotated. Thereafter, the latch mechanism 38 is released to rotate the actuator 14 counterclockwise as viewed in FIG. 1, so that the horn portions 52 slide down on the ramps 40 and the head sliders 28 are loaded to the magnetic disks 8.

When the computer is powered off or put into the sleep mode, control means such as an MPU mounted on a main printed circuit board (not shown) in the magnetic disk drive controls the actuator 14 so that the actuator 14 is rotated clockwise as viewed in FIG. 1 to move the head sliders 28 from the loaded condition through the outer circumferences of the magnetic disks 8 to the ramp member 36. Accordingly, the horn portions 52 of the head assemblies 26 slide up on the ramps 40 of the ramp member 36 and are then parked on the parking portions 42 of the ramp member 36. In this unloaded condition, the projecting portion 39 of the actuator 14 is latched by the latch mechanism 38.

Figure 3A:
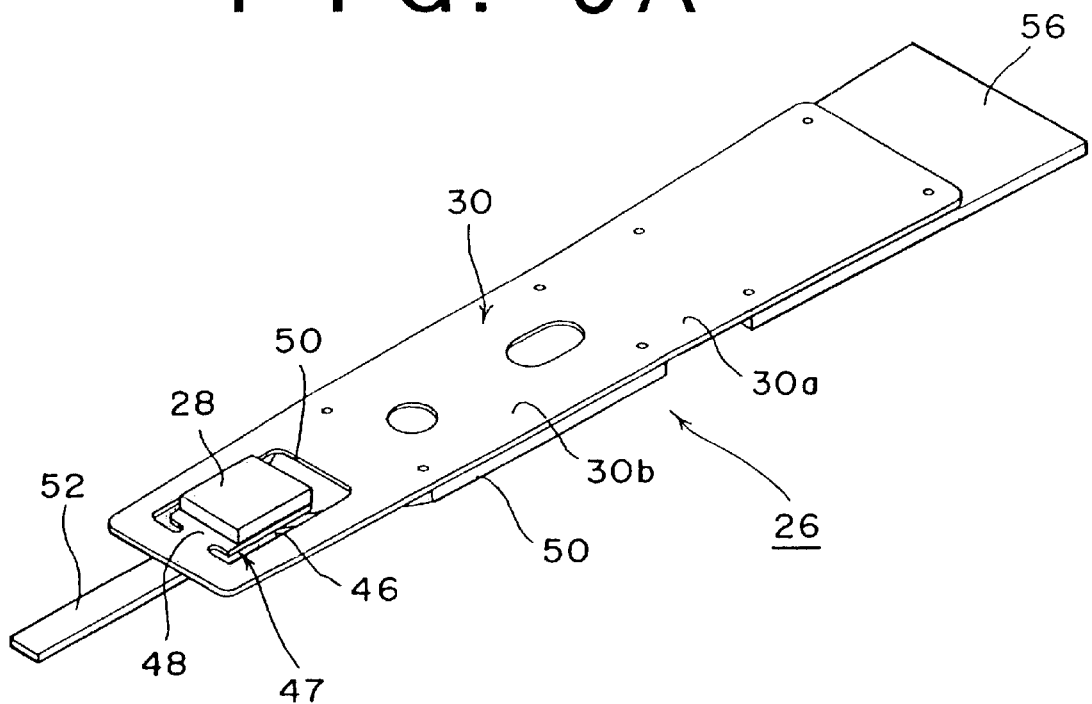
FIG. 3A is a perspective view of a head assembly according to a first preferred embodiment of the present invention.
Figure 3B:
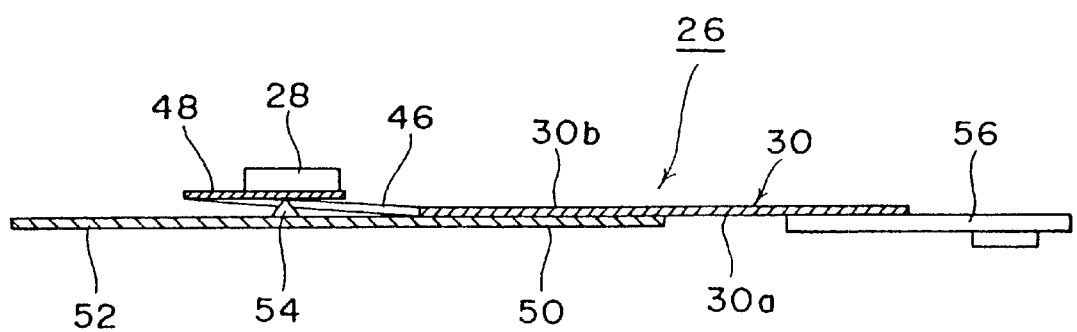
FIG. 3B is a longitudinal sectional view of the head assembly shown in FIG. 3A.
Figure 4:
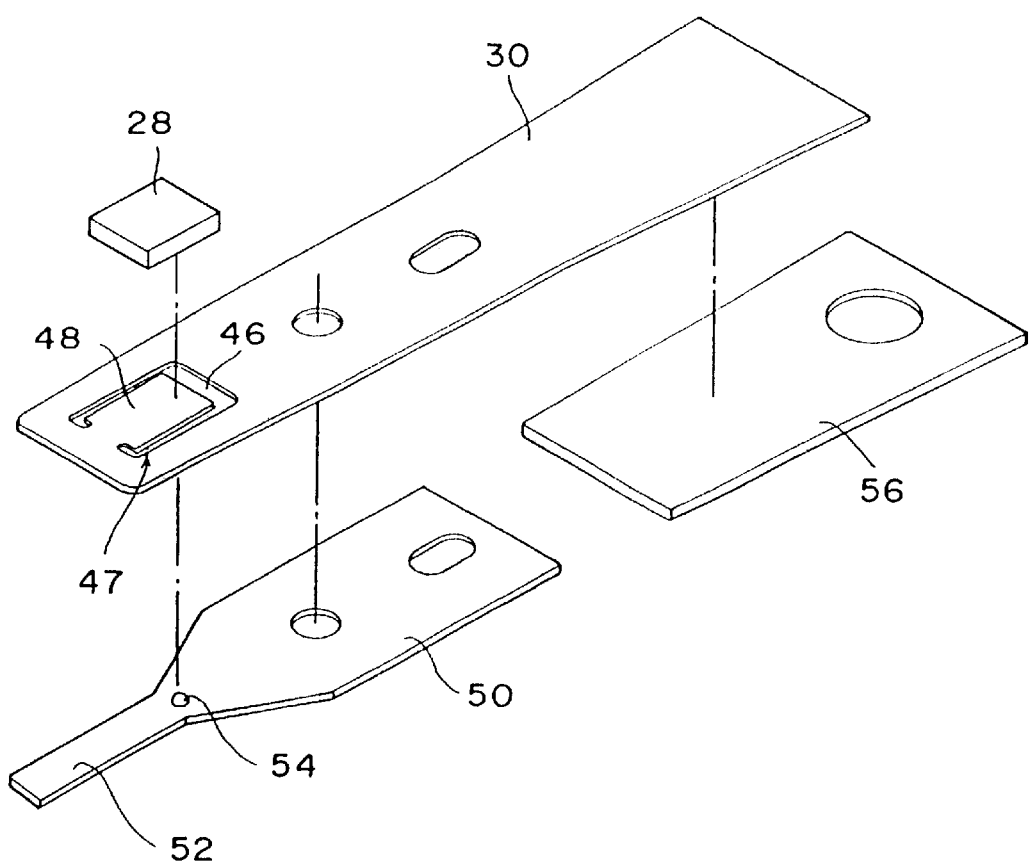
FIG. 4 is an exploded perspective view of the head assembly shown in FIG. 3A.

The head assembly 26 according to the first preferred embodiment of the present invention will now be described in detail with reference to FIGS. 3A to 7B. FIG. 3A is a perspective view of the head assembly 26, FIG. 3B is a longitudinal sectional view of the head assembly 26, and FIG. 4 is an exploded perspective view of the head assembly 26. As best shown in FIG. 4, the suspension 30 is integrally formed with a gimbal 47 having a slider mounting portion 48. The slider mounting portion 48 is defined by forming a U-shaped slit 46 at a front end portion of the suspension 30. The suspension 30 is formed of stainless steel, and it has a thickness of about 22 $\mu$m.

The suspension 30 includes a spring portion 30a for pressing the head slider 28 on the corresponding disk 8 and a rigid portion 30b. A reinforcing plate (supporting plate) 50 is fixed to the back surface of the rigid portion 30b by spot welding or the like. The reinforcing plate 50 is formed of stainless steel, for example, and it has a thickness about 1.0 times to about 2.0 times, preferably, about 1.3 times to about 1.5 times the thickness of the suspension 30. By setting the thickness of the reinforcing plate 50 in the above-mentioned range, the resonance frequency of the head assembly 26 can be increased and its mass increase can be minimized. If the thickness of the reinforcing plate 50 is set less than a value 1 times the thickness of the suspension 30, the rigidity of the rigid portion 30b decreases to cause a reduction in the resonance point.

Conversely, if the thickness of the reinforcing plate 50 is set greater than a value 2 times the thickness of the suspension 30, the mass of the head assembly 26 is increased to cause a reduction in impact acceleration upon separation of the head slider 28 from the disk 8, causing a deterioration in shock resistance. The horn portion 52 adapted to be seated onto the ramp member 36 is formed integrally with the reinforcing plate 50 at a front end portion thereof. The reinforcing plate 50 is further integrally formed with a pivot 54 having a tip kept in contact with the back surface of the slider mounting portion 48 of the gimbal 47 to support the head slider 28. Further, a spacer 56 formed of aluminum is fixed by spot welding to a base end portion of the suspension 30.

Figure 5:
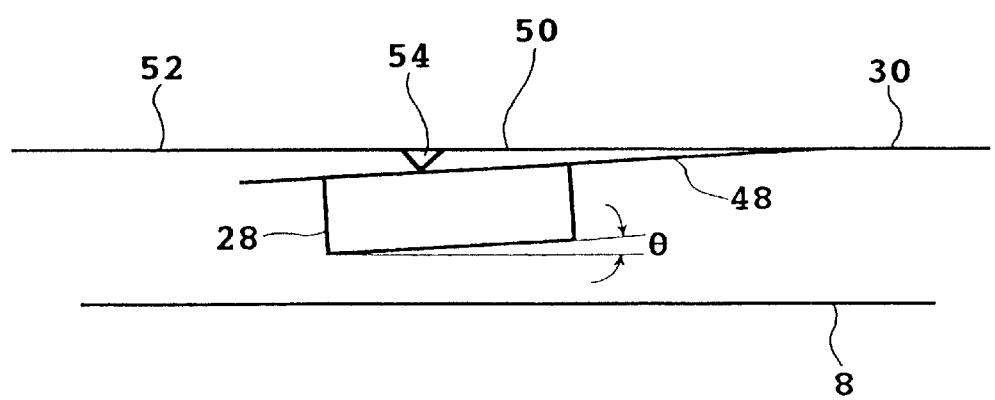
FIG. 5 is a schematic side view showing a pitch angle of a head slider in the first preferred embodiment.

Referring to FIG. 5, there is shown an attitude of the head slider 28 with respect to the disk 8 at the instant the head slider 28 parked on the ramp member 36 is loaded to the disk 8. In this preferred embodiment, the position of the pivot 54 is shifted from the longitudinal center of the head slider 28 toward the air outlet end of the head slider 28, thereby increasing a moment in a direction of lifting the air inlet end of the head slider 28.

That is, by increasing the moment in the direction of lifting the air inlet end, a pitch angle of θ is given to the head slider 28 at the instant the head slider 28 is loaded to the disk 8. In this manner, by increasing the moment in the direction of lifting the air inlet end to give the pitch angle θ to the head slider 28, it is possible to suppress the possibility that the air inlet end of the head slider 28 may be tilted down by a negative pressure. Accordingly, the tilt-down of the head slider 28 at its air inlet end at the instant of loading can be suppressed to thereby prevent the contact of the air inlet end with the disk 8.

Referring to FIG. 6, there is shown a relation between the position of the pivot 54 and the pitch angle θ of the head slider 28. In FIG. 6, the horizontal axis rperesents the proportion (%) of the amount of shift of the pivot position from the longitudinal center of the head slider 28 to the length of the head slider 28, in which the positive values for the proportion indicate that the pivot position is shifted toward the air outlet end. The vertical axis represents the pitch angle θ of the head slider 28. As apparent from FIG. 6, in the case that the pivot position is shifted toward the air inlet end, the pitch angle θ of the head slider 28 becomes negative, so that the air inlet end of the head slider 28 comes into contact with the disk 8 at the instant of loading. Further, in the case that the pivot position is shifted 20% or more toward the air outlet end, the pitch angle θ becomes excessive, so that the air outlet end of the head slider 28 comes into contact with the disk 8 at the instant of loading.

In view of these circumstances, the position of the pivot 54 supporting the head slider 28 is shifted from the longitudinal center of the head slider 28 toward the air outlet end by a distance less than 20% of the length of the head slider 28 in this preferred embodiment. Preferably, the position of the pivot 54 is shifted from the longitudinal center of the head slider 28 toward the air outlet end by a distance falling in the range of 4 to 15% of the length of the head slider 28. In this case, the pitch angle θ becomes about 0.5°.

Figure 7A:
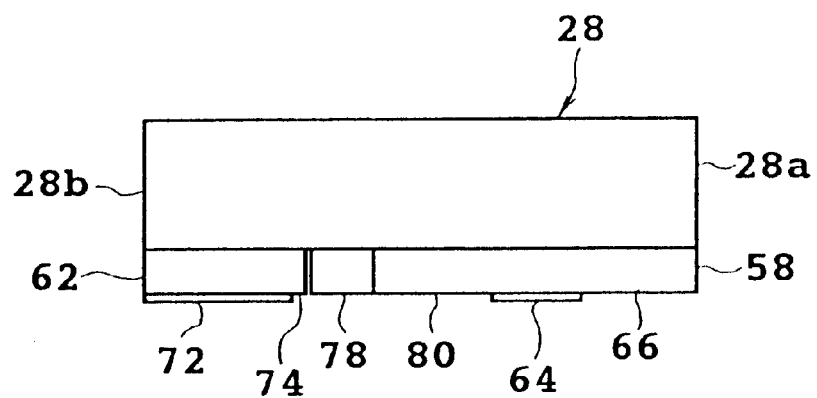
FIG. 7A is a side view of a negative type magnetic head slider applicable to the head assembly according to the first preferred embodiment.
Figure 7B:
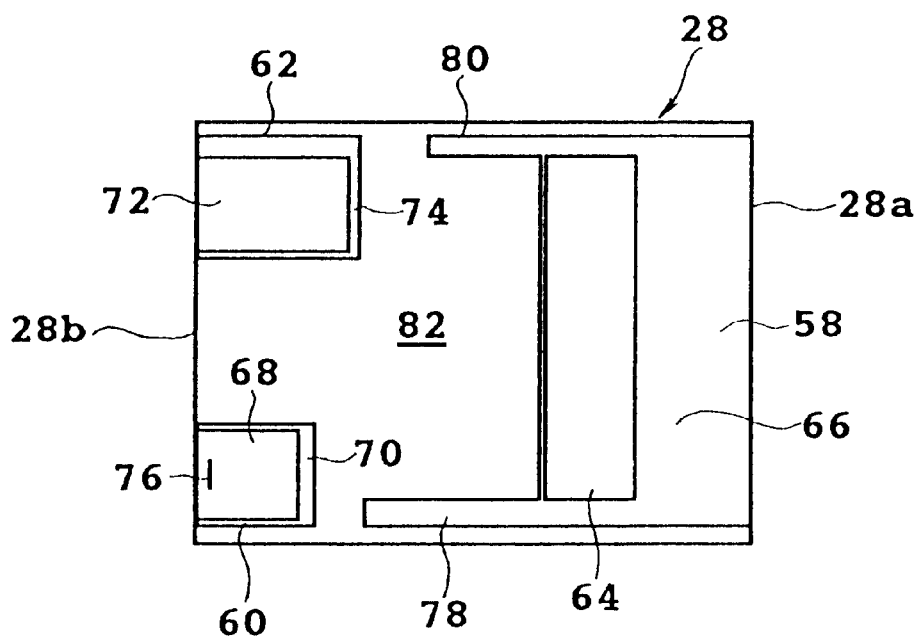
FIG. 7B is a bottom plan view of the head slider shown in FIG. 7A.

Referring to FIGS. 7A and 7B, there is shown an example of the negative pressure type magnetic head slider 28 employable in the first preferred embodiment. FIG. 7A is a side view of the head slider 28, and FIG. 7B is a bottom plan view of the head slider 28. The head slider 28 is in the form of rectangular parallelepiped, and has an air inlet end 28a and an air outlet end 28b. The bottom surface of the head slider 28 is a disk opposing surface adapted to face the corresponding disk 8. A front pad 58 is formed on the disk opposing surface of the head slider 28 at a position adjacent to the air inlet end 28a, and a pair of rear pads 60 and 62 are formed on the disk opposing surface of the head slider 28 at positions adjacent to the air outlet end 28b and transversely spaced from each other.

The front pad 58 is formed with a raised surface (air bearing surface) 64 extending in the transverse direction of the head slider 28 and a step surface 66 lower in level than the raised surface 64. Similarly, the rear pads 60 and 62 are formed with raised surfaces (air bearing surfaces) 68 and 72 and step surfaces 70 and 74 lower in level than the raised surfaces 68 and 72, respectively. The raised surface 68 is smaller in area than the raised surface 72. Accordingly, a flying force applied to the raised surface 72 is larger than that applied to the raised surface 68 in the head slider 28.

An electromagnetic transducer 76 is formed near the air outlet end of the rear pad 60, and the distance between the head slider 28 and the disk surface during rotation of the disk 8 is minimum near the electromagnetic transducer 76. When the disk 8 is rotated to generate an air flow along the disk surface, the air flow acts on the raised surfaces 64, 68, and 72. As a result, flying forces for flying the head slider 28 above the disk surface are generated on the raised surfaces 64, 68, and 72. In the head slider 28, the area of the raised surface 64 is relatively large, so that a relatively large flying force is generated on the raised surface 64 during rotation of the disk 8. As a result, the head slider 28 is maintained in an inclined attitude at a pitch angle α such that the air inlet end 28a is tilted up. This pitch angle α is different from the pitch angle θ shown in FIG. 5.

A pair of side pads 78 and 80 extend from the transverse ends of the front pad 58 toward the rear pads 60 and 62, respectively. A groove 82 for generating a negative pressure is defined between the side pads 78 and 80 on the downstream side of the front pad 58. The groove 82 extends from a position upstream of the longitudinal center of the head slider 28 to the air outlet end 28b. Accordingly, when passing the raised surface 64 of the front pad 58, the air flow is expanded in the groove 82 in a direction perpendicular to the disk surface, thereby generating a negative pressure in the groove 82. This negative pressure comes into balance with the above-mentioned flying forces applied to the raised surfaces 64, 68, and 72, thereby defining a flying height of the head slider 28.

Figure 8A:
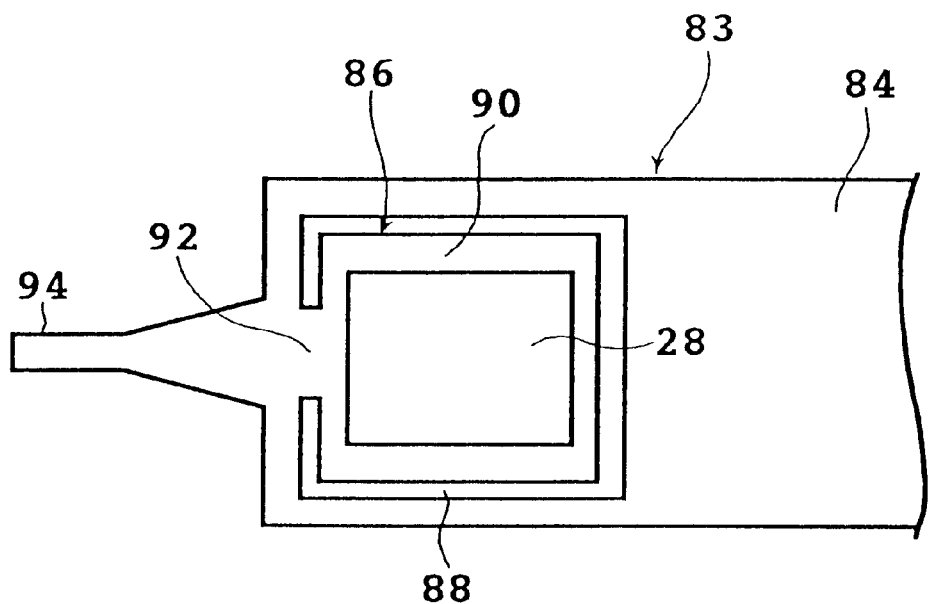
FIG. 8A is a plan view of a head assembly according to a second preferred embodiment of the present invention.
Figure 8B:
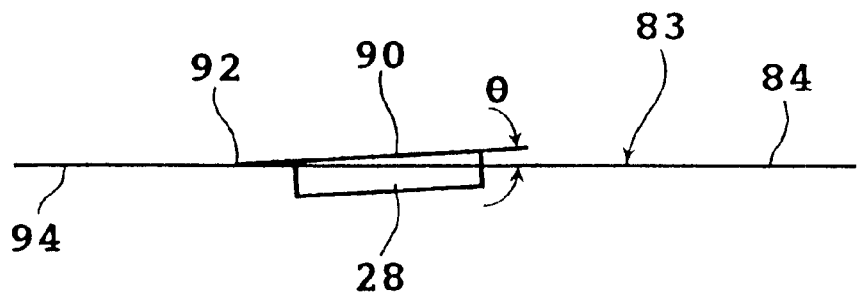
FIG. 8B is a side view of the head assembly shown in FIG. 8A.

Referring to FIG. 8A, there is shown a plan view of a head assembly 83 according to a second preferred embodiment of the present invention. FIG. 8B is a side view of the head assembly 83. In this preferred embodiment, the head assembly 83 has a suspension 84 integrally formed at its front end portion with a gimbal 86 having a slider mounting portion 90. The slider mounting portion 90 is defined by forming a U-shaped slit 88 at the front end portion of the suspension 84. The slider mounting portion 90 is integrally connected with the suspension 84 through a neck portion 92. As shown in FIG. 8B, the neck portion 92 is bent in such a direction that the flying surface of the head slider 28 is inclined with respect to the disk surface so as to raise the air inlet end of the head slider 28, thereby providing a given pitch angle θ. The pitch angle θ is set to less than 1°, preferably, about 0.5°.

The head slider 28 employable in this preferred embodiment may be selected from any negative pressure type magnetic head sliders including the head slider 28 shown in FIGS. 7A and 7B. Unlike the first preferred embodiment, the suspension 84 in the second preferred embodiment is integrally formed at its front end with a horn portion 94 adapted to be seated onto the ramp member 36 shown in FIG. 1 at the time of unloading. According to the second preferred embodiment, the given pitch angle is given to the head slider 28 in its unloaded condition where the head slider 28 does not fly above the disk surface. Accordingly, even when the air inlet end of the head slider 28 is drawn toward the disk surface by the negative pressure at the time of loading, the contact of the air inlet end with the disk surface can be prevented to allow stable loading of the head slider 28.

Figure 9A:
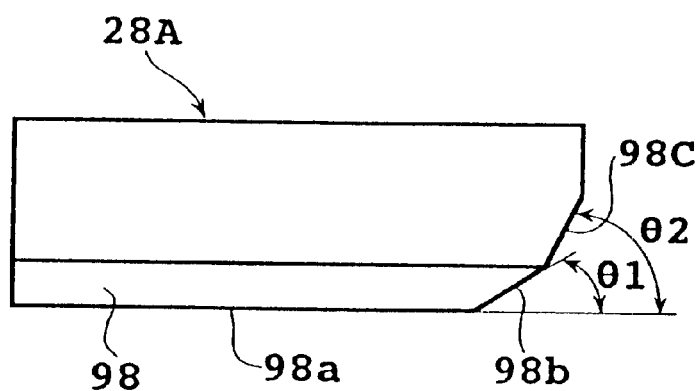
FIG. 9A is a side view of a negative pressure type magnetic head slider according to a third preferred embodiment of the present invention.
Figure 9B:
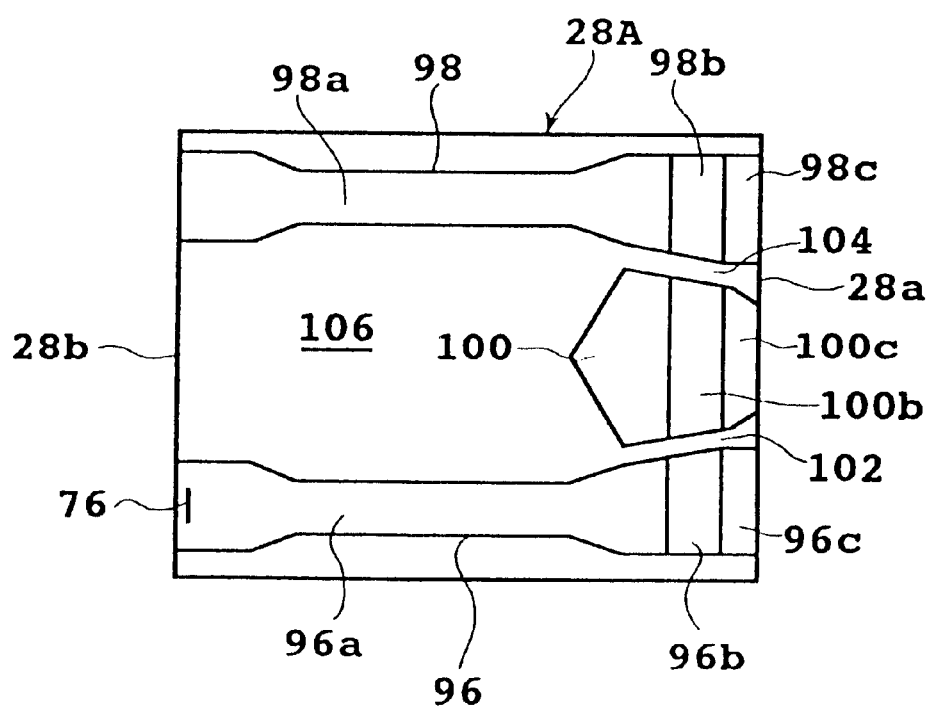
FIG. 9B is a bottom plan view of the head slider shown in FIG. 9A.

Referring to FIG. 9A, there is shown a side view of a negative pressure type magnetic head slider 28A according to a third preferred embodiment of the present invention. FIG. 9B is a bottom plan view of the head slider 28A shown in FIG. 9A. As shown in FIG. 9B, the head slider 28A has an air inlet end 28a and an air outlet end 28b. The bottom surface of the head slider 28A is formed as a disk opposing surface adapted to face the disk surface. A pair of rails 96 and 98 for generating a positive pressure are formed on the disk opposing surface of the head slider 28A. The rails 96 and 98 have flat air bearing surfaces 96a and 98a for generating flying forces during rotation of the disk 8, respectively.

An end portion of the rail 96 near the air inlet end 28a is formed with first and second tapers 96b and 96c contiguous to each other, and an end portion of the rail 98 near the air inlet end 28a is formed with first and second tapers 98b and 98c contiguous to each other. A center rail 100 is formed between the rails 96 and 98 near the air inlet end 28a. The center rail 100 is also formed with first and second tapers 100b and 100c contiguous to each other. A slit 102 is defined between the rail 96 and the center rail 100, and a slit 104 is defined between the rail 98 and the center rail 100. A groove 106 for generating a negative pressure by expanding the air once compressed near the air inlet end 28a is defined between the rails 96 and 98 on the downstream side of the center rail 100.

An electromagnetic transducer 76 is formed on the rail 96 near the air outlet end 28b of the head slider 28A. In each of the rails 96 and 98, an intermediate portion extending between the opposite end portions near the air inlet end 28a and the air outlet end 28b is narrower than each opposite end portion, thereby suppressing fluctuations in flying height due to changes in yaw angle. Each of the first tapers 96b, 98b, and 100b has a first taper angle θ1, and each of the second tapers 96c, 98c, and 100c has a second taper angle θ2 larger than the first taper angle θ1.

Figure 10:
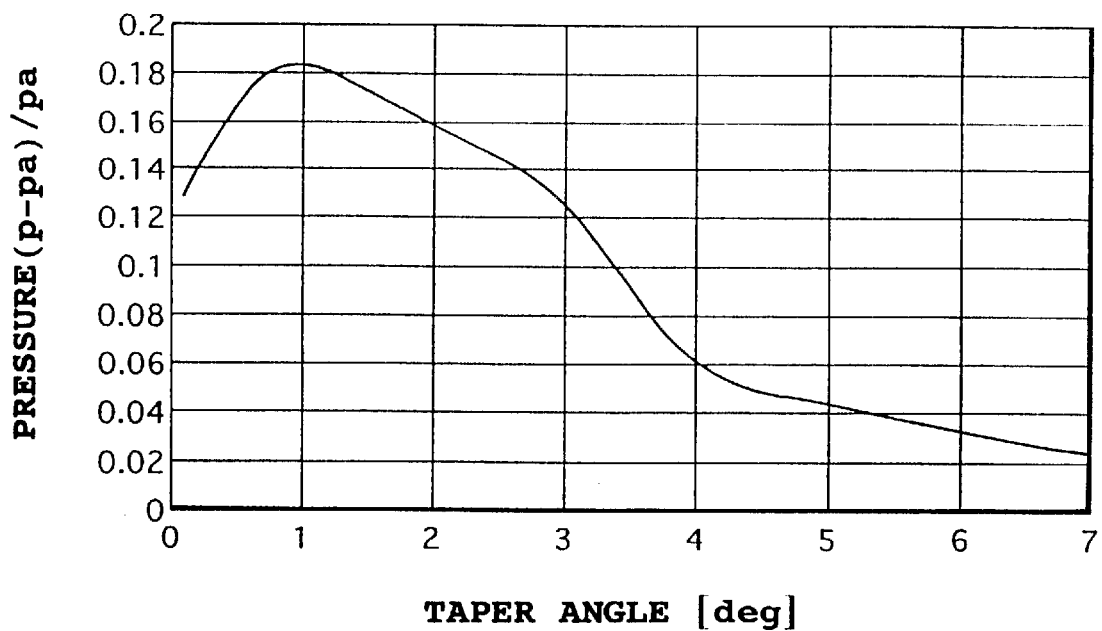
FIG. 10 is a graph showing the relation between a first taper angle and a pressure generated in the third preferred embodiment.

FIG. 10 shows a pressure generated on the first tapers 96b, 98b, and 100b. In FIG. 10, the horizontal axis represents the first taper angle θ1, and the vertical axis represents the proportion of the pressure generated on the first tapers 96b, 98b, and 100b, in which P is the pressure generated on the first tapers 96b, 98b, and 10b, and pa is the atmospheric pressure. As apparent from FIG. 10, the pressure rapidly decreases for the first taper angle θ1 greater than 3°, so that a pressure required for flying the head slider 28A cannot be ensured. Further, also when the first taper angle θ1 is less than 0.1°, the required pressure cannot be ensured. In view of these circumstances, the first taper angle θ1 is preferably set in the range of 0.1° to 3°.

In the head slider 28A, the second tapers 96c, 98c, and 100c are formed near the air inlet end 28a in addition to the first tapers 96b, 98b, and 100b. Thus, the head slider 28A has a two-stage tapering portion near the air inlet end 28a, thereby increasing a positive pressure generated near the air inlet end 28a of the head slider 28A.

By increasing the positive pressure generated near the air inlet end 28a, it is possible to suppress the possibility that the air inlet end 28a of the head slider 28A may be tilted down by the negative pressure generated in the groove 106. Accordingly, the tilt-down of the air inlet end 28a of the head slider 28A at the time of loading can be prevented to thereby eliminate the contact of the air inlet end 28a with the disk surface. The second taper angle θ2 is preferably set greater than the first taper angle θ1 and not greater than 6°. If the second taper angle θ2 is greater than 6°, the positive pressure generated near the air inlet end 0.28a is reduced, so that there is a possibility that the air inlet end 28a of the head slider 28A may come into contact with the disk surface at the time of loading.

Figure 11A:
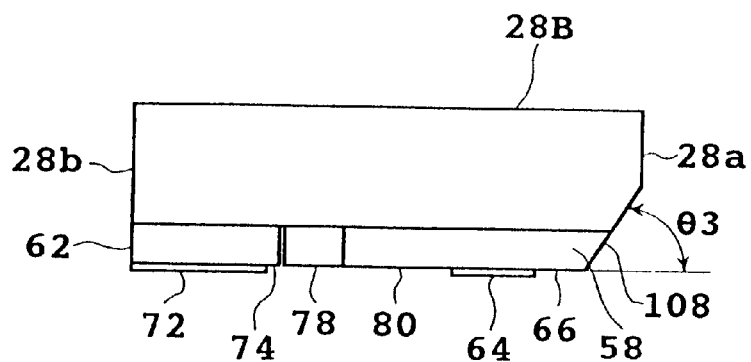
FIG. 11A is a side view of a negative pressure type magnetic head slider according to a fourth preferred embodiment of the present invention.
Figure 11B:
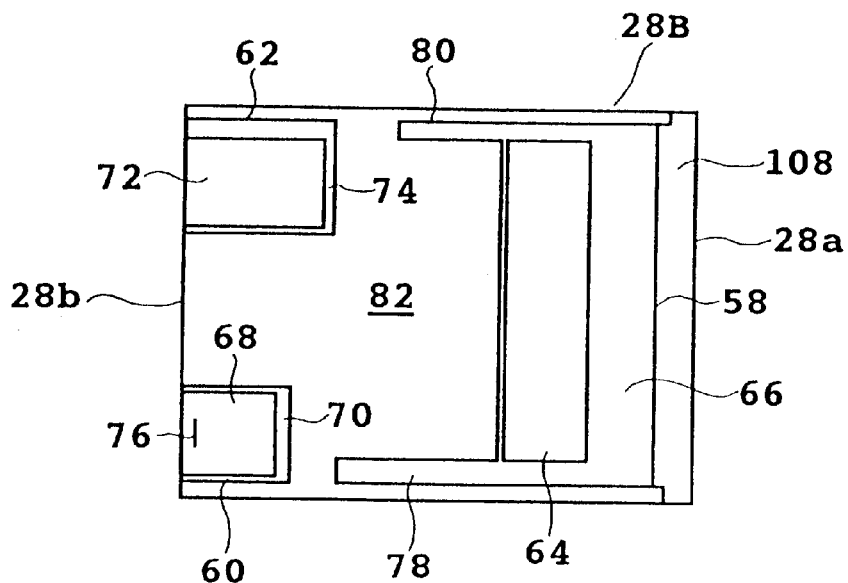
FIG. 11B is a bottom plan view of the head slider shown in FIG. 11A.

Referring to FIG. 11A, there is shown a side view of a negative pressure type magnetic head slider 28B according to a fourth preferred embodiment of the present invention. FIG. 11B is a bottom plan view of the head slider 28B shown in FIG. 11A. The head slider 28B is similar to the head slider 28 shown in FIGS. 7A and 7B. Accordingly, the same parts are denoted by the same reference numerals and only different parts will now be described. The head slider 28B has a taper 108 formed on the step surface 66 of the front pad 58 at a portion near the air inlet end 28a. The taper 108 has a taper angle θ3. The taper 108 is not contiguous to the raised surface 64 of the front pad 58.

By forming the taper 108 near the air inlet end 28a of the head slider 28B, a positive pressure generated near the air inlet end 28a can be increased. Accordingly, it is possible to suppress the possibility that the air inlet end 28a of the head slider 28B may be tilted down by the negative pressure generated in the groove 82. As a result, the tilt-down of the air inlet end 28a of the head slider 28B at the time of loading can be prevented to eliminate the contact of the air inlet end 28a with the disk surface.

FIG. 12 shows the proportion of a negative pressure to a positive pressure on the head slider 28B according to the taper angle θ3. In FIG. 12, the horizontal axis represents the taper angle θ3 of the taper 108, and the vertical axis represents the proportion of the negative pressure to the positive pressure, in which Pa is the positive pressure and Na is the negative pressure. As apparent from FIG. 12, the negative pressure becomes greater than the positive pressure for the taper angle θ3 greater than 6°, and the proportion of the negative pressure to the positive pressure changes to negative values.

If the negative pressure is greater than the positive pressure, the head slider 28B is drawn to the disk surface, so that the contact of the head slider 28B with the disk surface cannot be prevented. Accordingly, the taper angle θ3 must be not greater than 6°. The proportion of the negative pressure to the positive pressure for the taper angle θ3 equal to 6° is 0.02. Further, if the taper angle θ3 is less than 0.1°, the proportion of the negative pressure to the positive pressure becomes less than 0.02. Accordingly, the taper angle θ3 must be not less than 0.1°. In view of these circumstances, the taper angle θ3 is preferably set in the range of 0.1° to 6°.

Figure 13A:
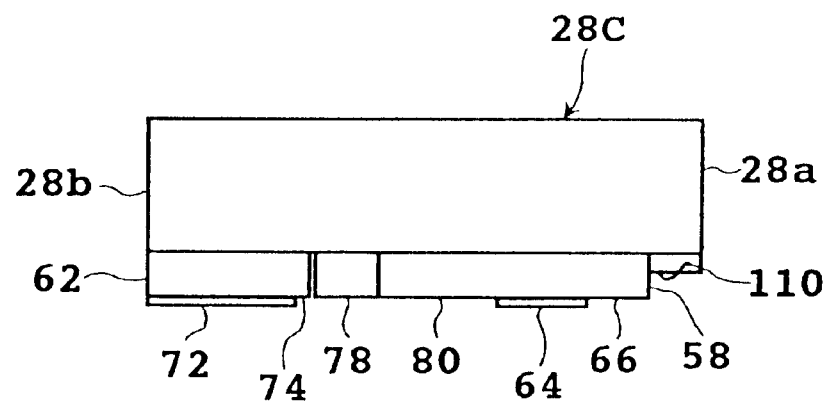
FIG. 13A is a side view of a negative pressure type magnetic head slider according to a fifth preferred embodiment of the present invention.
Figure 13B:
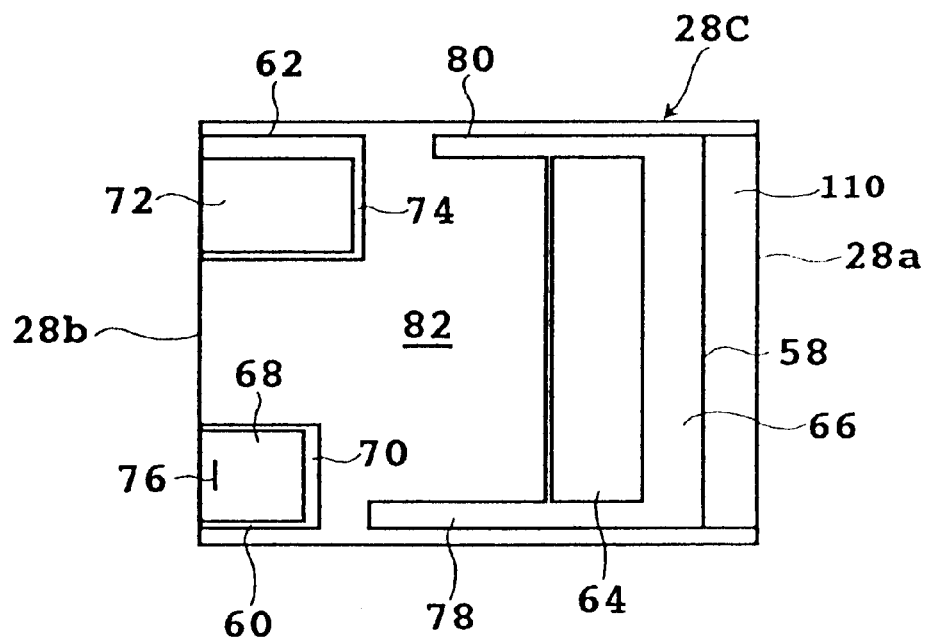
FIG. 13B is a bottom plan view of the head slider shown in FIG. 13A.

Referring to FIG. 13A, there is shown a side view of a negative pressure type magnetic head slider 28C according to a fifth preferred embodiment of the present invention. FIG. 13B is a bottom plan view of the head slider 28C shown in FIG. 13A. The head slider 28C is similar to the head slider 28 shown in FIGS. 7A and 7B. Accordingly, the same parts are denoted by the same reference numerals and only different parts will now be described. The head slider 28C has a second step surface 110 lower in level than the first step surface 66 near the air inlet end 28a. That is, the front pad 58 in this preferred embodiment has the raised surface 64 and the first and second step surfaces 66 and 110. The difference in level between the first and second step surfaces 66 and 110 is preferably set not greater than the depth of the groove 82 for generating a negative pressure.

Thus, the front pad 58 has the step surfaces 66 and 110 of different levels near the air inlet end 28a of the head slider 28C, thereby increasing a positive pressure generated near the air inlet end 28a of the head slider 28C. By thus increasing the positive pressure generated near the air inlet end 28a, it is possible to suppress the possibility that the air inlet end 28a of the head slider 28C may be tilted down by the negative pressure generated in the groove 82. Accordingly, the tilt-down of the air inlet end 28a of the head slider 28C at the time of loading can be prevented to thereby eliminate the contact of the air inlet end 28a with the disk surface.

Figure 14:
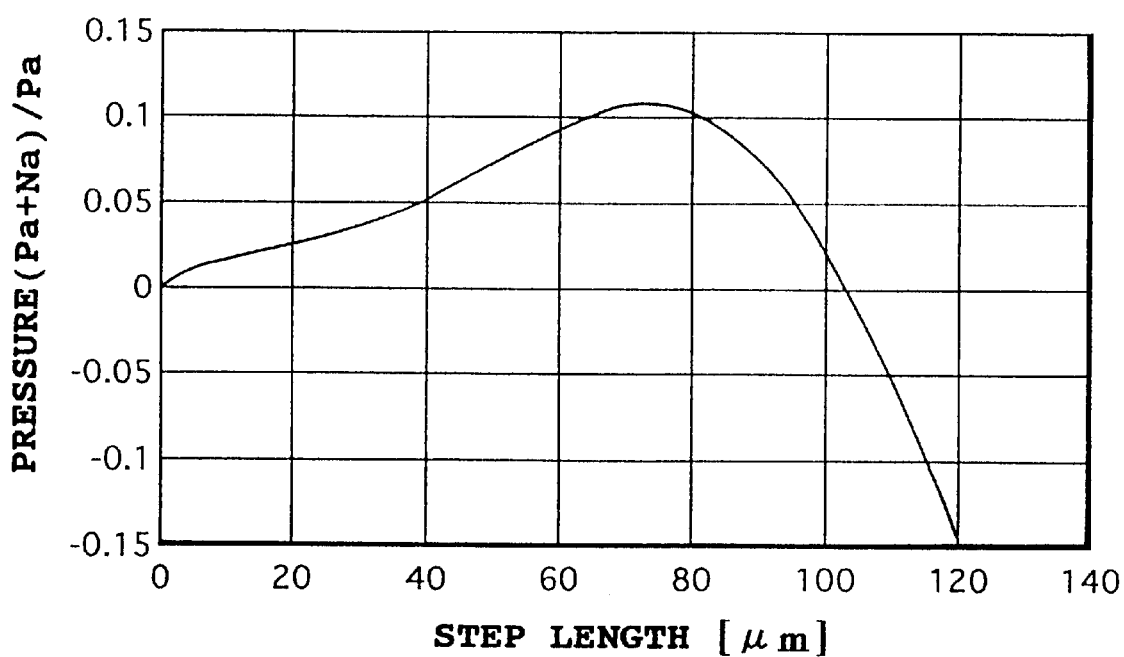
FIG. 14 is a graph showing the proportion of a negative pressure to a positive pressure according to the length of a second step surface in the fifth preferred embodiment.

FIG. 14 shows the proportion of a negative pressure to a positive pressure on the head slider 28C according to the length of the second step surface 110 in the longitudinal direction of the head slider 28C. In FIG. 14, the horizontal axis represents the length of the second step surface 110 in the longitudinal direction of the head slider 28C, and the vertical axis represents the proportion of the negative pressure to the positive pressure, in which Pa is the positive pressure and Na is the negative pressure. As apparent from FIG. 14, the negative pressure becomes greater than the positive pressure for the length of the second step surface 110 greater than 100 $\mu$m, and the proportion of the negative pressure to the positive pressure changes to negative values.

If the negative pressure is greater than the positive pressure, the head slider 28C is drawn to the disk surface, so that the contact of the head slider 28C with the disk surface cannot be prevented. Accordingly, the length of the second step surface 110 must be not greater than 100 $\mu$m. The proportion of the negative pressure to the positive pressure for the length of the second step surface 110 equal to 100 $\mu$m is 0.02. Further, if the length of the second step surface 110 is less than 10 $\mu$m, the proportion of the negative pressure to the positive pressure becomes less than 0.02. Accordingly, the length of the second step surface 110 must be not less than 10 $\mu$m. In view of these circumstances, the length of the second step surface 110 is preferably set in the range of 10 $\mu$m to 100 $\mu$m.

According to the present invention, the contact or collision between the magnetic disk and the magnetic head slider at the time of loading can be reliably avoided to thereby improve the reliability of a magnetic disk drive having a load/unload mechanism.

What is claimed is:

1. A disk drive comprising:
  a housing having a base;
  a disk rotatably mounted in said housing and having a plurality of tracks;
  a negative pressure type head slider having a transducer for reading/writing data from/to said disk, an air inlet end, an air outlet end, and a disk opposing surface;
  an actuator for moving said head slider across said tracks of said disk;
  means for controlling said actuator to load/unload said head slider with respect to said disk; and
  a ramp member fixed to said base for supporting said head slider unloaded;
  said actuator comprising:
    an actuator arm rotatably mounted to said base;
    a suspension having a base end portion fixed to a front end portion of said actuator arm; and
    said head slider mounted on a front end portion of said suspension;
  said head slider comprising:
    a single front pad formed on said disk opposing surface near said air inlet end, said front pad having a first raised surface and a first step surface lower in level than said first raised surface;
    a pair of rear pads formed on said disk opposing surface near said air outlet end, each of said rear pads having a second raised surface and a second step surface lower in level than said second raised surface;
    a groove for generating a negative pressure by expanding air once compressed by said front pad; and
    a taper formed adjacent to said air inlet end so as to continue to said step surface, said taper having a given taper angle.

2. A disk drive according to claim 1, wherein said given taper angle is in the range of 0.1° to 6°.

3. A disk drive comprising:
  a housing having a base;
  a disk rotatably mounted in said housing and having a plurality of tracks;
  a negative pressure type head slider having a transducer for reading/writing data from/to said disk, an air inlet end, an air outlet end, and a disk opposing surface;
  an actuator for moving said head slider across said tracks of said disk;
  means for controlling said actuator to load/unload said head slider with respect to said disk; and
  a ramp member fixed to said base for supporting said head slider unloaded;
  said actuator comprising:
    an actuator arm rotatably mounted to said base;
    a suspension having a base end portion fixed to a front end portion of said actuator arm; and
    said head slider mounted on a front end portion of said suspension;
  said head slider comprising:
    a single front pad formed on said disk opposing surface near said air inlet end, said front pad having a first raised surface, a first step surface lower in level than said first raised surface, and a second step surface lower in level than said first step surface;
    a pair of rear pads formed on said disk opposing surface near said air outlet end, each of said rear pads having a second raised surface and a third step surface lower in level than said second raised surface; and
    a groove for generating a negative pressure by expanding air once compressed by said front pad.

4. A disk drive according to claim 3, wherein the length of said second step surface in the longitudinal direction of said head slider is in the range of 10 $\mu$m to 100 $\mu$m.

* * * * *